US011635867B2

(12) United States Patent
Aspinall et al.

(10) Patent No.: US 11,635,867 B2
(45) Date of Patent: Apr. 25, 2023

(54) VIEWING IMAGES ON A DIGITAL MAP

(71) Applicant: Google LLC, Mountain View, CA (US)

(72) Inventors: James Aspinall, Mountain View, CA (US); Andre Santoso, Mountain View, CA (US); Juan Carlos Miguel Anorga, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/876,056

(22) Filed: May 17, 2020

(65) Prior Publication Data

US 2021/0357083 A1    Nov. 18, 2021

(51) Int. Cl.
| | |
|---|---|
| *G06F 3/048* | (2013.01) |
| *G06F 3/0481* | (2022.01) |
| *G06F 3/04842* | (2022.01) |
| *G06F 3/04845* | (2022.01) |
| *G06F 3/0485* | (2022.01) |

(52) U.S. Cl.
CPC .......... *G06F 3/0481* (2013.01); *G06F 3/0485* (2013.01); *G06F 3/04842* (2013.01); *G06F 3/04845* (2013.01); *G06F 2203/04803* (2013.01)

(58) Field of Classification Search
CPC ............... G06F 3/0481; G06F 3/04842; G06F 3/04845; G06F 3/0485; G06F 2203/04803
See application file for complete search history.

(56) References Cited

U.S. PATENT DOCUMENTS

| 6,201,517 B1 * | 3/2001 | Sato ..................... H04N 13/398 |
| | | 345/7 |
| 7,424,147 B2 * | 9/2008 | Obrador ................... H04N 1/62 |
| | | 358/538 |

(Continued)

FOREIGN PATENT DOCUMENTS

| EP | 1 818 838 | 8/2007 |
| JP | 10-285515 | 10/1998 |

(Continued)

OTHER PUBLICATIONS

"International Search Report and Written Opinion in International Application No. PCTUS2020/047854, filed Aug. 25, 2020", dated Jan. 29, 2021, 9 pages.

(Continued)

*Primary Examiner* — Mahelet Shiberou
(74) *Attorney, Agent, or Firm* — IP Spring

(57) ABSTRACT

Implementations described herein relate to methods, devices, and computer-readable media to display a user interface that includes a map portion and a grid portion. A method includes identifying a first set of images that match a first region of a digital map and causing a user interface to be displayed that includes a map portion that corresponds to the first region of the digital map and a grid portion that includes images of the first set. The method further includes receiving user input indicative of a second region of the digital map. The method further includes identifying a second set of images that match the second region of the digital map and updating the user interface such that the map portion of the updated user interface corresponds to the second region of the digital map and the grid portion of the updated user interface includes images of the second set.

18 Claims, 7 Drawing Sheets

(56) References Cited

U.S. PATENT DOCUMENTS

| | | | |
|---|---|---|---|
| 8,669,994 B2* | 3/2014 | Cardno | G07F 17/3255 |
| | | | 345/581 |
| 9,507,483 B2* | 11/2016 | Matas | G06Q 50/01 |
| 10,126,913 B1* | 11/2018 | Ho | G01C 21/3635 |
| 2004/0220965 A1* | 11/2004 | Harville | G06F 16/40 |
| | | | 707/E17.031 |
| 2009/0010491 A1* | 1/2009 | Ko | G06F 16/58 |
| | | | 382/103 |
| 2009/0073161 A1* | 3/2009 | Park | G11B 27/11 |
| | | | 345/418 |
| 2010/0198684 A1 | 8/2010 | Eraker et al. | |
| 2011/0219422 A1* | 9/2011 | Shen | G06F 15/16 |
| | | | 726/1 |
| 2012/0054668 A1* | 3/2012 | Ahn | G06F 16/29 |
| | | | 715/781 |
| 2012/0213404 A1* | 8/2012 | Steiner | G06F 16/5838 |
| | | | 382/103 |
| 2013/0332068 A1* | 12/2013 | Kesar | H04W 4/029 |
| | | | 701/430 |
| 2014/0040774 A1* | 2/2014 | Charytoniuk | G06F 16/5866 |
| | | | 715/753 |
| 2015/0066941 A1* | 3/2015 | Martin | G06F 16/2228 |
| | | | 707/741 |
| 2015/0153934 A1* | 6/2015 | Zherebtsov | G06F 16/00 |
| | | | 715/810 |
| 2015/0187098 A1* | 7/2015 | Ofstad | G01C 21/367 |
| | | | 345/629 |
| 2015/0213001 A1* | 7/2015 | Levy | G06F 40/106 |
| | | | 715/202 |
| 2017/0039264 A1* | 2/2017 | Brewington | G06F 16/285 |
| 2017/0069123 A1* | 3/2017 | Hochmuth | G06F 16/40 |
| 2018/0075061 A1 | 3/2018 | Purumala | |
| 2019/0303451 A1* | 10/2019 | Takahashi | G06F 16/20 |
| 2020/0410728 A1* | 12/2020 | Chen | G06V 10/44 |

FOREIGN PATENT DOCUMENTS

| | | |
|---|---|---|
| JP | 2007-219615 | 8/2007 |
| JP | 2010-182008 | 8/2010 |
| JP | 2010182008 | 8/2010 |
| JP | 2011-145407 | 7/2011 |
| KR | 10-2009-0002656 | 1/2009 |
| KR | 10-2012-0020010 | 3/2012 |
| KR | 10-2020-0010509 | 1/2020 |

OTHER PUBLICATIONS

"International Preliminary Report of Patentability in PCT/US20/047854", dated Mar. 12, 2022, 19 pages.

"Non-Final Office Action in JP Application No. 2021-514530", dated Sep. 6, 2022, 7 pages.

KIPO, Notice of Allowance for Korean Patent Application No. 10-2021-7006325, dated Nov. 2, 2022, 4 pages.

KIPO, Office Action for Korean Patent Application No. 10-2021-7006325, dated May 10, 2022, 6 pages.

* cited by examiner

VIEWING IMAGES ON A DIGITAL MAP

BACKGROUND

Users of devices such as smartphones or other digital cameras capture and store a large number of photos and videos in their libraries. Users utilize such libraries to view their photos and videos to reminisce about various events such as birthdays, weddings, vacations, trips, etc. One way to view photos is on a map, such that users can navigate to different places easily to view photos taken there.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations described herein relate to methods, devices, and computer-readable media to display a user interface that includes a map portion and a grid portion. In some implementations, the user interface may be a split-screen interface.

In some implementations, a computer-implemented method includes identifying a first set of images that match a first region of a digital map based on geographic information associated with the first set of images. The method further includes causing a user interface to be displayed that includes a map portion that corresponds to the first region of the digital map and a grid portion that includes one or more images of the first set of images. The method further includes receiving user input indicative of a second region of the digital map different from the first region. The method further includes identifying a second set of images that match the second region of the digital map based on geographic information associated with the second set of images, wherein the first set and the second set are different sets. The method further includes updating the user interface wherein, after the updating, the map portion of the updated user interface corresponds to the second region of the digital map and the grid portion of the updated user interface includes one or more images of the second set of images.

In some implementations, receiving the user input may include receiving one of: a pan input, a zoom-in input, or a zoom-out input. In some implementations, the map portion of the user interface may include an image preview that includes a particular image in the first set of images that is also included in the grid portion of the user interface. In some implementations, the image preview is anchored to a location in the map portion to a location associated with the particular image.

In some implementations, the method may include receiving scroll input with reference to the grid portion of the user interface, the scroll input indicative of a direction. The method may include, in response to receiving the scroll input, updating the grid portion of the user interface and causing the map portion of the user interface to be updated synchronously with the grid portion to modify the image preview to include a different image, wherein the different image is in the updated grid portion of the user interface.

In some implementations, the map portion of the user interface may further include a plurality of blobs displayed at respective locations in the first region of the digital map, wherein each blob corresponds to one or more images in the first set of images that are associated with the respective location. In some implementations, the method may further include receiving tap input in the map portion of the user interface, the tap input indicative of selection of a particular blob of the plurality of blobs. The method may further include, in response to receiving the tap input, causing the map portion of the user interface to be updated to modify the image preview to include a different image. The different image may be from the one or more images that correspond to the particular blob. The method may further include causing the grid portion of the user interface to be updated synchronous with the map portion, wherein the updated grid portion includes the different image.

In some implementations, each image in the first set of images may be associated with a respective timestamp. The method may further include identifying images that are associated with timestamps that are within a threshold time difference from a timestamp associated with the particular image of the image preview, and displaying a respective icon for one or more of the identified images. The respective icon may be displayed at a location in the first region of the digital map that is associated with a corresponding image of the identified images.

Some implementations relate to a computing device to display a user interface that includes a map portion and a grid portion. In some implementations, a computing device may include a processor and a memory coupled to the processor with instructions stored thereon. The instructions when executed by the processor, cause the processor to perform operations that include identifying a first set of images that match a first region of a digital map based on geographic information associated with the first set of images, causing a user interface to be displayed that includes a map portion that corresponds to the first region of the digital map and a grid portion that includes one or more images of the first set of images, receiving user input indicative of a second region of the digital map different from the first region, identifying a second set of images that match the second region of the digital map based on geographic information associated with the second set of images, and updating the user interface wherein, after the updating, the map portion of the updated user interface corresponds to the second region of the digital map and the grid portion of the updated user interface includes one or more images of the second set of images. In some implementations, map portion of the user interface may include an image preview that includes a particular image in the first set of images that is also included in the grid portion of the user interface.

In some implementations, the operations may further include receiving scroll input with reference to the grid portion of the user interface, the scroll input indicative of a direction, and in response to receiving the scroll input, updating the grid portion of the user interface and causing the map portion of the user interface to be updated to modify the image preview to include a different image, wherein the different image is in the updated grid portion of the user interface.

In some implementations, the map portion of the user interface may further include a heatmap that includes a plurality of blobs displayed at respective locations in the first region of the digital map. Each blob may correspond to one or more images in the first set of images that are associated with the respective location.

In some implementations, the operations may further include receiving tap input in the map portion of the user interface, the tap input indicative of selection of a particular blob of the plurality of blobs. The operations may further include, in response to receiving the tap input, causing the map portion of the user interface to be updated to modify the image preview to include a different image, wherein the different image is from the one or more images that correspond to the particular blob. The operations may further include causing the grid portion of the user interface to be updated, wherein the updated grid portion includes the different image.

In some implementations, each image in the first set of images may be associated with a respective timestamp. In some implementations, the operations may further include identifying images that are associated with timestamps that are within a threshold time difference from a timestamp associated with the particular image of the image preview, and displaying a respective icon for one or more of the identified images, the respective icon displayed at a location in the first region of the digital map that is associated with a corresponding image of the identified images.

Some implementations relate to a non-transitory computer-readable medium that includes instructions stored thereon that, when executed by a processor, cause the processor to perform operations that include identifying a first set of images that match a first region of a digital map based on geographic information associated with the first set of images, causing a user interface to be displayed that includes a map portion that corresponds to the first region of the digital map and a grid portion that includes one or more images of the first set of images, receiving user input indicative of a second region of the digital map different from the first region, identifying a second set of images that match the second region of the digital map based on geographic information associated with the second set of images, wherein the first set and the second set are different sets, and updating the user interface wherein, after the updating, the map portion of the updated user interface corresponds to the second region of the digital map and the grid portion of the updated user interface includes one or more images of the second set of images. In some implementations, the operation of receiving the user input may include receiving one of: a pan input, a zoom-in input, or a zoom-out input.

In some implementations, the map portion of the user interface may include an image preview that includes a particular image in the first set of images. In some implementations, the image preview may be anchored to a location in the map portion to a location associated with the particular image.

In some implementations, the operations may further include receiving scroll input with reference to the grid portion of the user interface, the scroll input indicative of a direction, and in response to receiving the scroll input, updating the grid portion of the user interface and causing the map portion of the user interface to be updated synchronously with the grid portion to modify the image preview to include a different image, wherein the different image is in the updated grid portion of the user interface.

In some implementations, the map portion of the user interface may further include a plurality of blobs displayed at respective locations in the first region of the digital map. Each blob may correspond to one or more images in the first set of images that are associated with the respective location.

In some implementations, the operations may further include receiving tap input in the map portion of the user interface, the tap input indicative of selection of a particular blob of the plurality of blobs. The operations may further include, in response to receiving the tap input, causing the map portion of the user interface to be updated to modify the image preview to include a different image, wherein the different image is from the one or more images that correspond to the particular blob. The operations may further include causing the grid portion of the user interface to be updated synchronous with the map portion, wherein the updated grid portion includes the different image.

In some implementations, the operations may further include identifying images that are associated with timestamps that are within a threshold time difference from a timestamp associated with the particular image of the image preview, and displaying a respective icon for one or more of the identified images, the respective icon displayed at a location in the first region of the digital map that is associated with a corresponding image of the identified images.

DETAILED DESCRIPTION

This disclosure relates to an interactive split-screen user interface in which a map portion that includes a digital map and a grid portion that includes one or more images from a user's image library are provided. The map portion includes a visualization, e.g. a heatmap that includes blobs, of various shapes and/or colors, indicative of the number of images in a user's image library that are associated with different locations.

The user interface enables a user to perform operations such as pan, zoom, etc. to jump to particular locations in the digital map by providing input with reference to the map portion. In response to such operations, the grid portion is updated to display images that correspond to the geographic region of the map portion. The user interface also enables a user to scroll the grid portion to view different images, in response to which the map portion is updated to show image previews. In some implementations, the map portion and grid portion are updated synchronously. In some implementations, the map portion also includes icons for photos that are taken within a time period, e.g., a single day. The user can tap the icons to view images from that day.

Synchronous updates of the user interface are enabled by generating and storing in a database an index of locations associated with images in a user's image library. Further, in-memory caching may be utilized in generation of the user interface, including the heatmap. The described implementations provide an intuitive and convenient user interface to browse images by location and/or by timestamps associated with images. By enabling a user to directly view images associated with a particular location, e.g., by a touch or voice input, the computational resources necessary for the user to enter typed input are conserved. For example, the computational load associated with navigating a map to "San Francisco" can be lower than that associated with receiving typed input "San Francisco."

Figure 1:
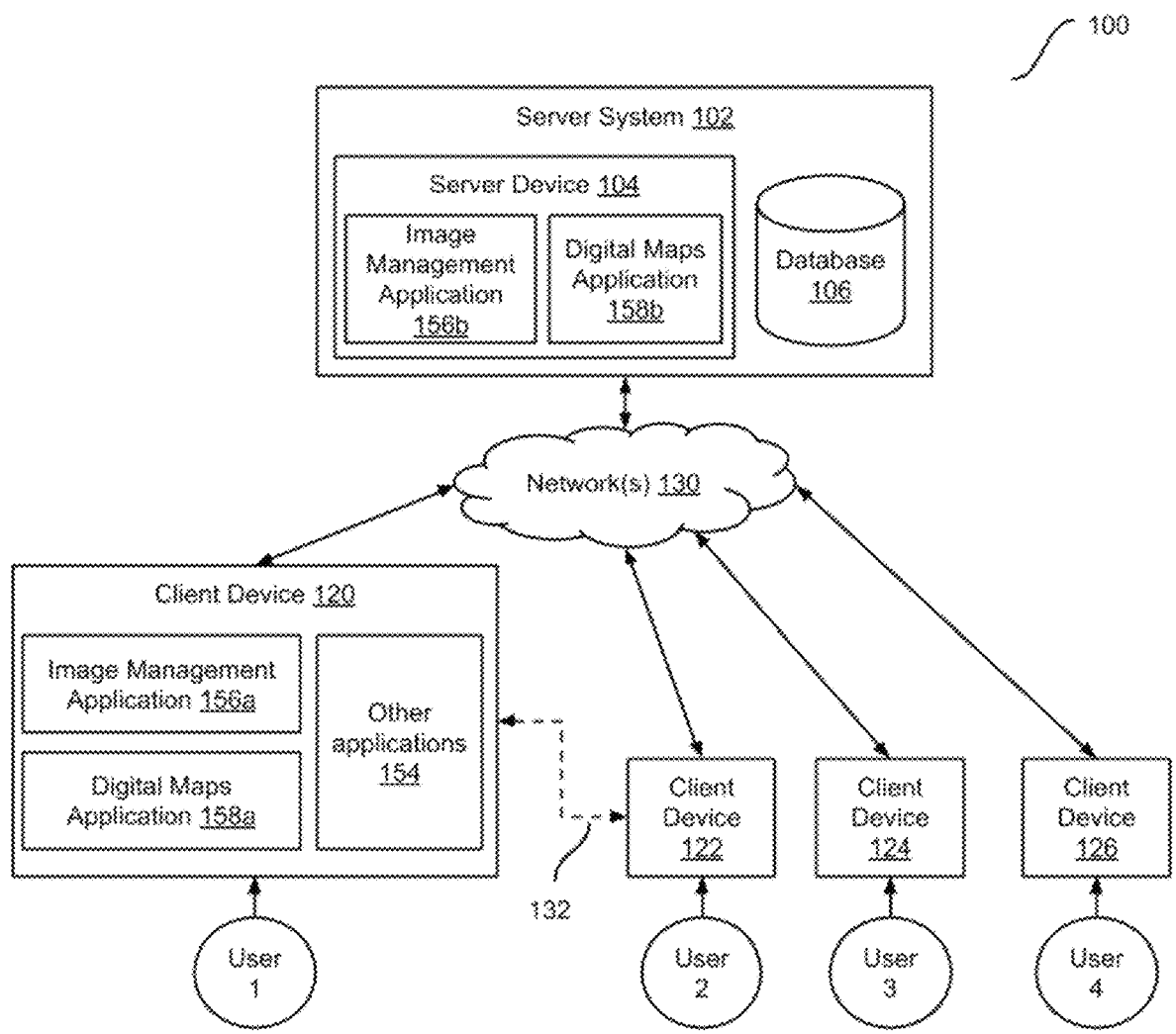
FIG. 1 is a block diagram of an example network environment which may be used for one or more implementations described herein.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. In some implementations, server device 104 may provide image management application 156b and digital maps application 158b. In FIG. 1 and the remaining figures, a letter after a reference number, e.g., "156a," represents a reference to the element having that particular reference number. A reference number in the text without a following letter, e.g., "156," represents a general reference to embodiments of the element bearing that reference number.

Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication between devices, e.g., using peer-to-peer wireless protocols (e.g., Bluetooth®, Wi-Fi Direct, etc.), etc. One example of peer-to-peer communications between two client devices 120 and 122 is shown by arrow 132.

For ease of illustration, FIG. 1 shows one block for server system 102, server device 104, database 106, and shows four blocks for client devices 120, 122, 124, and 126. Blocks 102, 104, and 106 may represent multiple systems, server devices, and network databases, and the blocks can be provided in different configurations than shown. For example, server system 102 can represent multiple server systems that can communicate with other server systems via the network 130. In some implementations, server system 102 can include cloud hosting servers, for example. In some examples, database 106 and/or other storage devices can be provided in server system block(s) that are separate from server device 104 and can communicate with server device 104 and other server systems via network 130.

Also, there may be any number of client devices. Each client device can be any type of electronic device, e.g., desktop computer, laptop computer, portable or mobile device, cell phone, smartphone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102 and/or via a network service, e.g., a social network service or other type of network service, implemented on server system 102. For example, respective client devices 120, 122, 124, and 126 may communicate data to and from one or more server systems, e.g., server system 102.

In some implementations, the server system 102 may provide appropriate data to the client devices such that each client device can receive communicated content or shared content uploaded to the server system 102 and/or a network service. In some examples, users U1-U4 can interact via audio or video conferencing, audio, video, or text chat, or other communication modes or applications.

A network service implemented by server system 102 can include a system allowing users to perform a variety of communications, form links and associations, upload and post shared content such as images, text, video, audio, and other types of content, and/or perform other functions. For example, a client device can display received data such as content posts sent or streamed to the client device and originating from a different client device via a server and/or network service (or from the different client device directly), or originating from a server system and/or network service. In some implementations, client devices can communicate directly with each other, e.g., using peer-to-peer communications between client devices as described above. In some implementations, a "user" can include one or more programs or virtual entities, as well as persons that interface with the system or network.

In some implementations, any of client devices 120, 122, 124, and/or 126 can provide one or more applications. For example, as shown in FIG. 1, client device 120 may provide image management application 156a and digital maps application 158a. Client devices 122-126 may also provide similar applications. Image management application 156a may be implemented using hardware and/or software of client device 120. In different implementations, image management application 156a may be a standalone client application, e.g., executed on any of client devices 120-124, or may work in conjunction with image management application 156b provided on server system 102. Image management application 156a may provide various functions related to images and/or videos. For example, such functions may include one or more of capturing images or videos using a camera, analyzing images or videos to associate one or more tags, modifying images or videos, storing images or videos in a library or database, providing user interfaces to view images or videos, etc.

In some implementations, image management application 156 may enable a user to manage the library or database that stores images and/or videos. For example, a user may use a backup functionality of image application 156a on a client device (e.g., any of client devices 120-126) to back up local images or videos on the client device to a server device, e.g., server device 104. For example, the user may manually select one or more images or videos to be backed up, or specify backup settings that identify images or videos to be backed up. Backing up an image or video to a server device may include transmitting the image or video to the server for storage by the server, e.g., in coordination with image application 156b on server device 104.

In some implementations, client device 120 and/or client devices 122-126 may include a digital maps application 158a. Digital maps application 158a may be implemented using hardware and/or software of client device 120. In different implementations, digital maps application 158a may be a standalone client application, e.g., executed on any of client devices 120-124, or may work in conjunction with digital maps application 158b provided on server system 102. Digital maps application 158a may provide various functions related to digital maps. For example, such functions may include one or more of displaying a digital map of the world, at different zoom levels and in different views (e.g., satellite view, navigation view, etc.); enabling a user to navigate to different locations in the map by operations such as pan or zoom; enabling a user to bookmark locations on the map; providing an application programming interface (API) for other applications, e.g., to enable the other applications to display a digital map and enable interaction with the digital map, etc. Digital maps application 158a may store data, e.g., map information, locally on client device 120, and/or may retrieve information from server device 104. In some implementations, digital maps application 158a may cache a portion of the digital map on client device 120.

In different implementations, client device 120 may include other applications 154 that may be applications that provide various types of functionality, e.g., calendar, address book, e-mail, web browser, shopping, transportation (e.g., taxi, train, airline reservations, etc.), entertainment (e.g., a music player, a video player, a gaming application, etc.), social networking (e.g., messaging or chat, audio/video calling, sharing images/video, etc.) and so on. In some implementations, one or more of other applications 154 may be standalone applications that execute on client device 120. In some implementations, one or more of other applications 154 may access a server system, e.g., server system 102, that provides data and/or functionality of other applications 154.

A user interface on a client device 120, 122, 124, and/or 126 can enable the display of user content and other content, including images, video, data, and other content as well as communications, privacy settings, notifications, and other data. Such a user interface can be displayed using software on the client device, software on the server device, and/or a combination of client software and server software executing on server device 104, e.g., application software or client software in communication with server system 102. The user interface can be displayed by a display device of a client device or server device, e.g., a touchscreen or other display screen, projector, etc. In some implementations, application programs running on a server system can communicate with a client device to receive user input at the client device and to output data such as visual data, audio data, etc. at the client device.

Other implementations of features described herein can use any type of system and/or service. For example, other networked services (e.g., connected to the Internet) can be used instead of or in addition to a social networking service. Any type of electronic device can make use of features described herein. Some implementations can provide one or more features described herein on one or more client or server devices disconnected from or intermittently connected to computer networks. In some examples, a client device including or connected to a display device can display content posts stored on storage devices local to the client device, e.g., received previously over communication networks.

An image as referred to herein can include a digital image having pixels with one or more pixel values (e.g., color values, brightness values, etc.). An image can be a still image (e.g., still photos, images with a single frame, etc.), a dynamic image (e.g., animations, animated GIFs, cinema graphs where a portion of the image includes motion while other portions are static, etc.), or a video (e.g., a sequence of images or image frames that may include audio). While the remainder of this document refers to an image as a static image, it may be understood that the techniques described herein are applicable for dynamic images, video, etc. For example, implementations described herein can be used with still images (e.g., a photograph, or other image), videos, or dynamic images.

Figure 2:
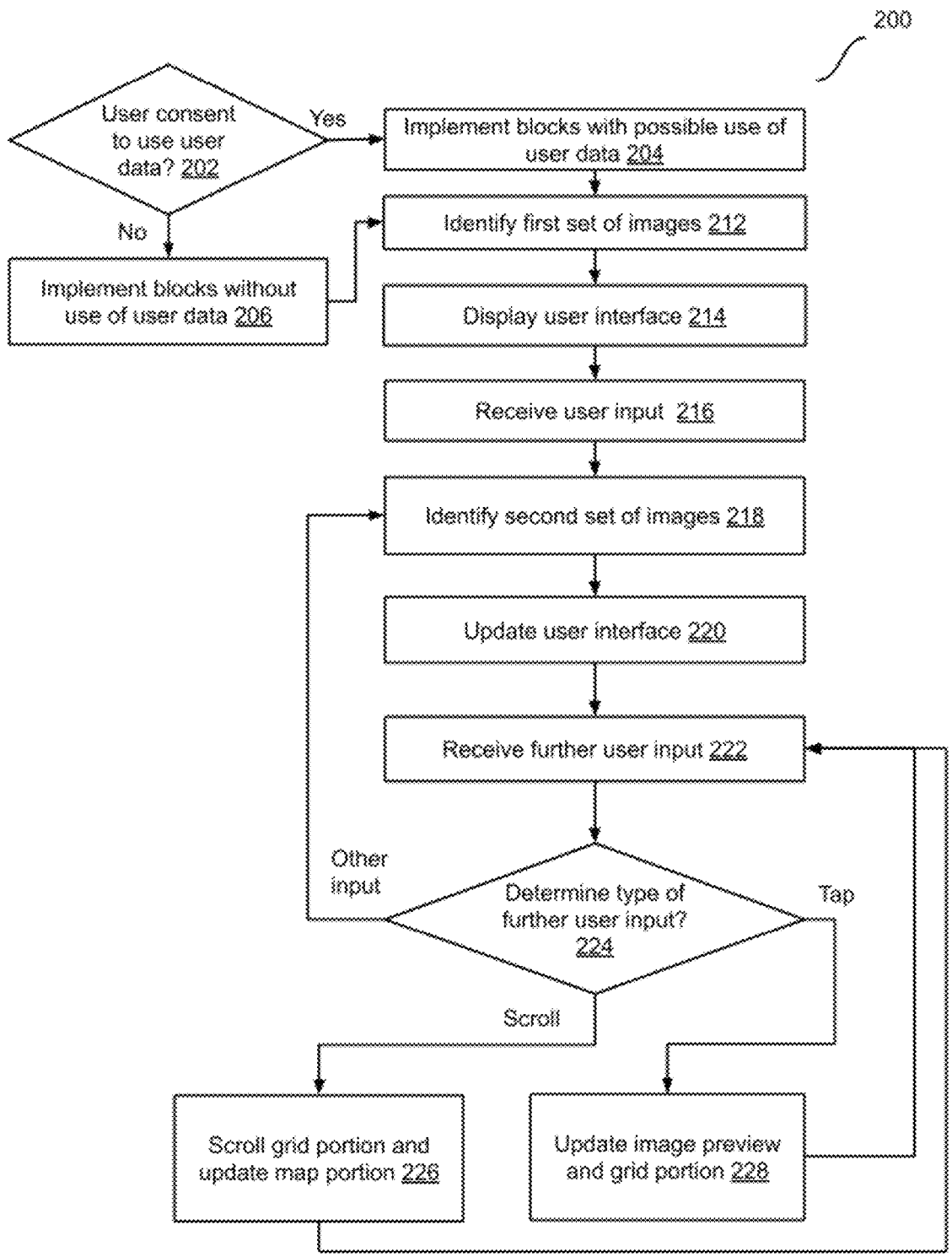
FIG. 2 is a flow diagram illustrating an example method, according to some implementations.

FIG. 2 is a flow diagram illustrating an example method 200, according to some implementations. In some implementations, method 200 can be implemented, for example, on a server system 102 as shown in FIG. 1. In some implementations, some or all of the method 200 can be implemented on one or more client devices 120, 122, 124, or 126 as shown in FIG. 1, one or more server devices, and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200. In some examples, a first device is described as performing blocks of method 200. Some implementations can have one or more blocks of method 200 performed by one or more other devices (e.g., other client devices or server devices) that can send results or data to the first device.

In some implementations, the method 200, or portions of the method, can be initiated automatically by a system. In some implementations, the implementing system is a first device. For example, the method (or portions thereof) can be periodically performed, or performed based on one or more particular events or conditions, e.g., a client device entering an idle state, a threshold number of videos that are not backed up, a new video being captured or stored on a client device, a predetermined time period having expired since the last performance of method 200, and/or one or more other conditions occurring which can be specified in settings read by the method.

Method 200 may begin at block 202. In block 202, it is checked whether user consent (e.g., user permission) has been obtained to use user data in the implementation of method 200. For example, user data can include images or videos stored on a client device (e.g., any of client devices 120-126), videos stored or accessed by a user, e.g., using a client device, image metadata, user data related to the use of an image management application, user preferences, etc. One or more blocks of the methods described herein may use such user data in some implementations.

If user consent has been obtained from the relevant users for which user data may be used in the method 200, then in block 204, it is determined that the blocks of the methods herein can be implemented with possible use of user data as described for those blocks, and the method continues to block 212. If user consent has not been obtained, it is determined in block 206 that blocks are to be implemented without the use of user data, and the method continues to block 212. In some implementations, if user consent has not been obtained, blocks are implemented without the use of user data and with synthetic data and/or generic or publicly-accessible and publicly-usable data. In some implementations, if user consent has not been obtained, method 200 is not performed.

In block 212, a first set of images is identified. In some implementations, the first set of images may be identified based on a respective location associated with each image in the first set of images matching a first region of a digital map. In different implementations, the first region may be selected automatically as a zoomed-out region such that all locations that are associated with images in a user's image library are included, a region that includes a location where recent images in the user's image library were captured, or a region associated with a highest number of images in user's image library.

The first set of images may be selected from a image library of a user, e.g., management using image management application 156. Images in the image library may be associated with geographic information, e.g., a respective location. In some implementations, the images may be associated with other metadata such as a timestamp of creation or capture of the image, a timestamp indicative of when the image was last edited, etc.

For example, the location for an image may be determined based on location metadata (e.g., latitude and longitude) obtained from a sensor on-board or in communication with a device that captured the image. In another example, the location for an image may be determined based on triangulation of wireless signals detected by a device that captured the image. In another example, the location for an image may be determined by applying object detection techniques to detect one or more objects in the image, performing object recognition to identify a landmark, and assigning the image a location that is associated with the landmark, e.g., in a digital map or other repository. For example, if the object depicted in an image is "Eiffel Tower," corresponding location coordinates can be assigned to the image. In some implementations, if the user permits, data from other sources, e.g., the user's calendar, the user's location history, etc. In some implementations, if an image is not associated with a location, the location may be determined to be the same as that of another image with a timestamp that is very close in time (e.g., within a few seconds, or minutes).

In some implementations, an image database may be maintained that includes an image identifier for each image and a location associated with the image. The image database may be stored on a client device (client device 120) and/or on a server system (e.g., server system 104). In some implementations, an index may be maintained in the image database based on the location data. Such an index may enable quick lookup of the database to identify images based on a region of the digital map. In some implementations, the index may be stored in memory when the image management application is in use, to enable fast retrieval of images that correspond to different map regions. In some implementations, a quad-tree structure may be used for the index to enable fast lookup, e.g., by subdividing regions into four quadrants at different stages of the lookup. For example, a lookup of the quad-tree structure may be performed based on the region of the map (map viewport) that is displayed in the map portion.

In some implementations, the first set of images may include images in a user's image library that have associated geographic information that matches a first region of a digital map. For example, the first region of the digital map may be indicated as a set of latitude and longitude values that defines the region. Images that match the first region of the digital map may be identified such that each image in the first set of images is within the first region, based on the location associated with the image. In some implementations, a user's image library may be stored on client device 120 and/or a server system 102 (e.g., in database 106 or other storage device). In some implementations, the server system 102 may be synchronized with the client device 120 such that both devices include the same set of images. In these implementations, the first set of images may include images in the user's library that match the location criteria, irrespective of whether method 200 is performed on client device 120, on server device 104, or a combination.

In some implementations, e.g., if client device 120 has less storage capacity, only a portion of the user's image library may be stored on client device 120. In some implementations, when method 200 is performed on client device 120, the first set of images may be selected from images that are stored locally on client device 120 and images stored on the server system 102 are not queried. For example, such selection may be performed when client device 120 is offline (e.g., disconnected from network 130) or has a low-speed connection.

In some implementations, the first set of images may be selected to include images that are stored on client device 120 and on server system 102, e.g., when client device 120 is coupled to server system 102 via network 130 and the network connection is a high-speed connection sufficient to perform such a query and to retrieve images. In some implementations, e.g., when client device 120 does not store any images locally, selection of the first set of images may be performed entirely on server system 102.

In some implementations, identifying the first set of images may be performed such that some images that match the first region are excluded from the first set of images. For example, such images may include images of bills/receipts, documents, newspaper articles, screenshots, meme images, etc. and other such images. In another example, such images may include images that do not meet a quality threshold, e.g., blurry images, images that are dark (e.g., all black or nearly black images), etc. In another example, images that are detected to be duplicates or near duplicates of other images in the user's image library may be excluded from the first set of images. Indicators of the type of image (e.g., receipt, document, article, screenshot, etc.), quality of the image, and/or whether the image is a duplicate may be stored in association with the images, e.g., in database 106 or other storage device of server system 102, or in client device 120, and may be utilized in the selection of the first set of images.

Block 212 may be followed by block 214.

In block 214, a user interface is caused to be displayed, e.g., on client device 120. The user interface includes a map portion that corresponds to the first region of the digital map and a grid portion that includes one or more images of the first set of images. In some implementations, images may be organized in the grid portion based on a creation timestamp associated with the image, e.g., in reverse chronological order.

For example, the map portion may be displayed in a top part of the user interface and the grid portion may be displayed in a bottom part of the user interface. In some implementations, the user interface may also include a count of images in the first set of images.

In some implementations, the map portion of the user interface may include a digital map, e.g., that includes map features such as town/city names, streets, or other features. In some implementations, the map portion of the user interface may further include an image preview. The image preview may include a particular image in the first set of images that is also included in the grid portion of the user interface. In some implementations, the image preview may act as a selectable user interface element. For example, the user may tap the image preview to view the corresponding image, e.g., in a full-screen mode.

In some implementations, the image preview may be anchored to a location in the map portion to a location associated with the particular image. For example, if the particular image was taken in Paris at the Eiffel Tower, the image preview may be anchored in the map portion to the latitude and longitude of the Eiffel Tower. In some implementations, the image preview may be a user interface element in the shape of a circle shown anchored to the location in the map portion by a triangle shape. Anchoring in this context may serve to indicate to the user the location associated with the image. In some implementations, the image in the image preview may be the first image in the grid portion (e.g., a most recent image that matches the first region of the digital map).

In some implementations, the map portion of the user interface may further include a heatmap. In some implementations, the heatmap may include plurality of blobs formed based on the number of images corresponding to different locations of the digital map. Each blob may be displayed at a respective location in the first region of the digital map. The heatmap, formed of a plurality of blobs, may provide a visual indication of the number of images in the first set of images that are associated with different locations in the first region of the digital map. In some implementations, a size of the blob may be based on a number of images that the blob corresponds to.

In some implementations, the color of each blob may be based on the number of images in the first set of images that corresponds to that location. For example, the color spectrum (e.g., red to violet) may be used to represent the relative number of images for different locations. A large number of photos that are associated with the same (or nearby location, based on the zoom level of the digital map) may be represented by blobs of warmer colors (e.g., red, orange), while a smaller number of photos associated with the same (or nearby) location may be represented by blobs of cooler colors (e.g., violet).

The heatmap may include a plurality of blobs, with techniques such as gradient colors, blur, etc. being applied in border regions where blobs intersect. In some implementations, images in the first set of images may be grouped into buckets that correspond to different locations and a value may be assigned to each bucket based on the number of images in the bucket. To render the blobs, the values may be smoothed and mapped into a color gradient for the heatmap.

In some implementations, some colors of the color spectrum may be excluded from being used as blob colors. For example, such colors may be chosen based on the underlying region (e.g., first region) of the digital map, e.g., when the map region includes ocean or other water bodies, represented by a shade of blue, the color blue may be excluded from use in the heatmap. In some implementations, the heatmap may be drawn as an overlay on top of the digital map.

In some implementations, images in the first set of images may be associated with a respective timestamp, e.g., that indicates a time at which the image was captured. In some implementations, images that are associated with timestamps that are within a threshold time difference from a timestamp associated with the particular image of the image preview may be identified. A respective icon may be displayed for one or more of the identified images at a location in the first region of the digital map that is associated with a corresponding image of the identified images. The icon may be, e.g., a dot of a distinctive color (e.g., black, white, etc.) that stands out from the blobs of the heatmap.

For example, the threshold time difference may be selected such that the identified images are from a same calendar day as the particular image that is in the image preview. In another example, the threshold time difference may be selected such that the identified images are from the same episode.

In some implementations, the user interface may be configurable by the user. For example, in a default view, the map portion and the grid portion may be of the same size, e.g., each taking up about half of the available display space. The user may perform a gesture (e.g., a drag gesture) to resize the portions, e.g., to enlarge the map portion or to enlarge the grid portion. In response to the gesture, the corresponding region may be enlarged, e.g., additional rows of the image grid that include additional images from the first set of images may be displayed in the grid portion, a larger version of the map portion may be displayed, etc.

In some implementations, the grid portion of the user interface may display the one or more images of the first set of images divided into a plurality of episodes that are arranged chronologically, e.g., in reverse order, with the most recent image of the most recent episode being displayed first.

For example, if the first set includes 50 images, 20 of which were taken on a first day (e.g., Feb. 1, 2020) and 30 images that were taken earlier (e.g., on Dec. 31, 2019), the user interface may include a first text label, e.g., "Feb. 1, 2020" (or "February 2020") after which the first 20 images are included, and a second text label, e.g., "Dec. 31, 2019" (or "December 2019") after which the 30 images are displayed.

In some implementations, images in the first set of images may be divided into a plurality of episodes, each with a corresponding time period. For example, if the first region corresponds to a national park, and the user's image library has images from multiple time periods during which the user visited the national park, each episode may correspond to a particular visit to the national park. In different contexts, the episodes may correspond to different time periods, e.g., 1-day per episode, 1-week per episode, 1-episode per location within a time period, etc. Dividing the first set of images into episodes (e.g., based on time and/or date boundaries) and displaying corresponding text labels may facilitate the user's navigation of the grid portion. Further, with user permission, the text labels may include additional contextual information regarding the episode that the images belong to, e.g., "Anita's birthday," "Fall 2019 Trip to Yosemite," etc. Block 214 may be followed by block 216.

In block 216, user input indicative of a second region of the digital map is received. For example, the user input may be received as a pan input, a zoom-in input, or a zoom-out input. The user input may be received via a suitable input mechanism of client device 120, such as a touchscreen, via gesture detection (e.g., using a radar sensor in client device 120), via the user selecting particular user interface elements, as spoken input, etc. For example, the user may perform a drag operation on a touchscreen to provide the pan input, a pinch gesture to provide a zoom-out input, etc. Based on the user input, e.g., the distance covered by the drag input or the pinch gesture, the second region of the map is identified. In some implementations, the user input may be spoken input, e.g., "Show my pictures from Los Angeles" and the second region indicated by the user input may be disjoint from the first region. Block 216 may be followed by block 218.

In block 218, a second set of images that match the second region of the digital map is identified based on geographic information associated with the second set of images, similar to block 212. For example, if the second region is larger than the first region and subsumes the first region (e.g., when the input is a zoom-out input), the second set of images may include all images in the first set and additional images. In another example, if the second region is smaller than the first region (e.g., a sub-region of the first region, indicated by a zoom-in input), the second set of images may be a subset of the first set of images. In another example, if the first region and second region overlap partially (e.g., the input is a pan-input), the second set of images may include one or more images from the first set that correspond to the overlapping portion of the digital map, and one or more other images. In different implementations, user input indicative of different map regions may be received, e.g., a combination of pan and/or zoom inputs, and the corresponding set of images may be identified. Block 218 may be followed by block 220.

In block 220, the user interface is updated. In some implementations, after updating the user interface, the map portion of the user interface corresponds to the second region of the digital map (indicated by the user input) and the grid portion of the user interface includes one or more images of the second set of images. A corresponding image preview may also be displayed in the user interface. Further, the heatmap in the map portion of the user interface is also updated. Block 220 may be followed by block 222.

In block 222, further user input is received. Block 222 may be followed by block 224.

In block 224, and the type of further user input is determined. For example, the further user input may be determined to be pan input, zoom-in input, zoom-out input, or other input indicative of a change in the region of the digital map that is displayed in the map portion of the user interface. When the further user input is indicative of the change in the region of the digital map, block 224 is followed by block 218, where the corresponding set of images is identified.

Alternatively, the further user input may be determined to be scroll input received with reference to the grid portion of the user interface, or tap input received with reference to the map portion of the user interface. If the further user input is determined to be the scroll input, block 224 is followed by block 226. If the further user input is determined to be the tap input, block 224 is followed by block 228.

In block 226, the grid portion and the map portion are updated based on the scroll input. For example, the scroll input may be received as a scroll gesture performed by the user on a touch screen of the client device in the grid portion of the user interface. In another example, the scroll input may be spoken input, e.g., "show me more," "show me older images," "show me newer images," etc. The scroll input may be indicative of a direction. For example, when images in the grid portion are organized in a chronological order, scroll input may be indicative of scrolling in the direction of older images, or newer images.

Based on the direction indicated by the scroll input, the grid portion of the user interface is updated to show further images of the set of images (e.g., the second set of images, as displayed in the updated user interface after the performance of block 220), e.g., older or newer images, when images in the grid portion are organized chronologically. The update to the grid portion may further be based on an intensity or level of the scroll. For example, a long scroll gesture may cause the entire grid portion to be replaced with other images (e.g., corresponding to a different time period or episode) while a short scroll gesture may cause display of only a small number of other images, e.g., a single row of other images (e.g., corresponding to the same time period/episode, or an adjacent time period/episode in the chronological order).

Further, in some implementations, the map portion of the user interface may be updated to modify the image preview to include a different image. The different image that is included in the image preview may be an image in the updated grid portion. In some implementations, the map portion may be updated synchronously with the grid portion such that the updated grid portion and updated image preview in the map portion are displayed in the user interface at substantially the same time.

Synchronous update of the user interface in this manner allows the user to view a consistent user interface, where the image preview in the map portion always corresponds to the grid portion of the user interface. The region of the digital map displayed in the map portion does not change in response to the scroll input, since the grid portion is restricted to images that correspond to the region of the digital map displayed in the map portion. In other words, every image in the grid portion is associated with a location that is within the region displayed in the map portion. Block 226 may be followed by block 222.

If it is determined in block 224 that the further user input is the tap input, block 224 is followed by block 228. The tap input may be indicative of a particular blob of the plurality of blobs in the map portion of the user interface. Based on the particular blob, the map portion of the user interface may be updated to modify the image preview to include a different image. The different image is selected from the one or more images that correspond to the particular blob. The grid portion of the user interface may also be updated to include the different image. For example, if the different image is from images of a different time period or episode than that in the image preview displayed prior to the tap input, the grid portion is updated to include images from the different time period or episode. In some implementations, the grid portion may be updated synchronously with the map portion such that the modified image preview and updated grid portion are displayed in the user interface at substantially the same time. Synchronous update of the user interface in this manner allows the user to view a consistent user interface, where the image preview in the map portion always corresponds to the grid portion of the user interface. Block 228 may be followed by block 222.

Various blocks of method 200 may be combined, split into multiple blocks, or be performed in parallel. For example, blocks 212 and 214 may be performed in parallel, e.g., the map portion may be rendered while the first set of images is being identified and the heatmap may be rendered on top of the map portion. For example, blocks 218 and 220 may be performed in parallel.

In some implementations, various blocks of method 200 may be performed in different order from that shown in FIG. 2, and/or some blocks may not be performed. For example, blocks 212-214 may be performed to display a user interface with the first set of images corresponding to the first region, and block 222-224 may be performed next, e.g., to determine the type of user input and perform block 226 (if the user input is scroll input), block 228 (if the user input is tap input), or block 218-220 (if the user input is other input, e.g., pan, zoom-in, zoom-out, or other input). In this example, block 216 may not be performed.

Method 200, or portions thereof, may be repeated any number of times using additional inputs. For example, different sequences of blocks 218-228 may be repeated any number of times to enable a user to view different portions of the map in the map portion and corresponding images in their image library in the grid portion, by providing different types of input.

The user interface with the map portion and the grid portion in a split-screen view provides the user geospatial context while viewing images in their image library. The user can navigate to different regions in the digital map (via pan, zoom, or other input) and view a heatmap that indicates the number of photos that were taken at different locations with the different regions. The user can zoom in to individual locations (e.g., a city block) to view photos taken at these locations. The user can scroll the grid to view photos taken in the same region over time. The user interface thus provides rich information content (a digital map, with heatmap overlay of the user's image library) and enables easy interaction for the user to view their image library while providing spatial context for each image.

The map portion of the user interface provides an input mechanism for the user to set a location filter, while the grid portion provides an input mechanism for the user to select a particular time period or episode. The split-screen user interface reduces the user burden of providing input to filter images. For example, instead of typing a search query such as "Show my photos from Yosemite taken in summer 2016," the user can simply select the region of the digital map that corresponds to Yosemite national park and scroll to summer 2016. Further, the user interface enables users to view images at a particular location even when they do not remember the name of the location, by simply selecting the corresponding region of the digital map.

A user may access the split-screen user interface in different ways. For example, the user can select or search for a particular category of locations (e.g., "national parks," "beaches," "mountains," etc.) to view a digital map with photos taken at different locations of that category. In another example, the user can select or search for a particular object (e.g., "tennis court," "hiking gear," etc.) and view images that depict the object taken at different locations. In yet another example, if the user has associated names with persons depicted in images in their image library (e.g., "Me," "Bob," "Alice," etc.), the user can view images of that person taken at various locations. For example, the user may choose to view images of themselves (e.g., selfies or other images that depict the user) on a map of the world to reminisce about different places that they have visited.

In some implementations, the user interface may enable the user to further filter the images that are displayed in the image preview and/or the grid portion. For example, the user may choose to view images that match a particular region and are identified as favorites, shared with other users, ordered as prints, or meet another criterion.

In some implementations, the user interface may permit the user to select a particular time period or episode such that the map portion depicts images from the selected time period. For example, the user may select an episode "3 days in Arizona" to view corresponding images. In some implementations, icons may be displayed in the map portion for each image from the time period. Still further, in some implementations, the icons may be displayed (e.g., using colors, numbers, etc.) such that a path taken by the user and the places that the user stopped at during the particular episode can be viewed in the map portion. In some implementations, lines or arrows indicating the path taken by the user during the time period (as detected based on locations associated with images in the user's image library) may be displayed in the map portion.

Method 200 may provide several technical benefits. The split-screen user interface that enables users to view images in their image library by location and by time in the same user interface. The user interface reduces the computational load that is incurred when the user scrolls through a grid user interface to search for a particular image (e.g., when the user cannot find it via search). The computational load of such scrolling through the image library may be large, based on the size of the library. Loading a large number of images may require significant memory and computing power, and may be difficult on devices with low memory. On the other hand, by narrowing down the library view to a specific region (e.g., where the user remembers having captured the image), the number of images that need to be displayed for the user to find a particular image is reduced, thus reducing the computational load. Still further, the computational load incurred in processing multiple scroll inputs (e.g., hundreds of scroll inputs) is reduced, since the number of inputs required to select a particular region of a digital map may be far less in number.

Still further, by generating, storing, and utilizing a database that includes an index of locations associated with images in the user's image library, the computational load to generate and display a heatmap may be lower than if the heatmap is to be generated by reading image metadata for individual images.

Figure 3:
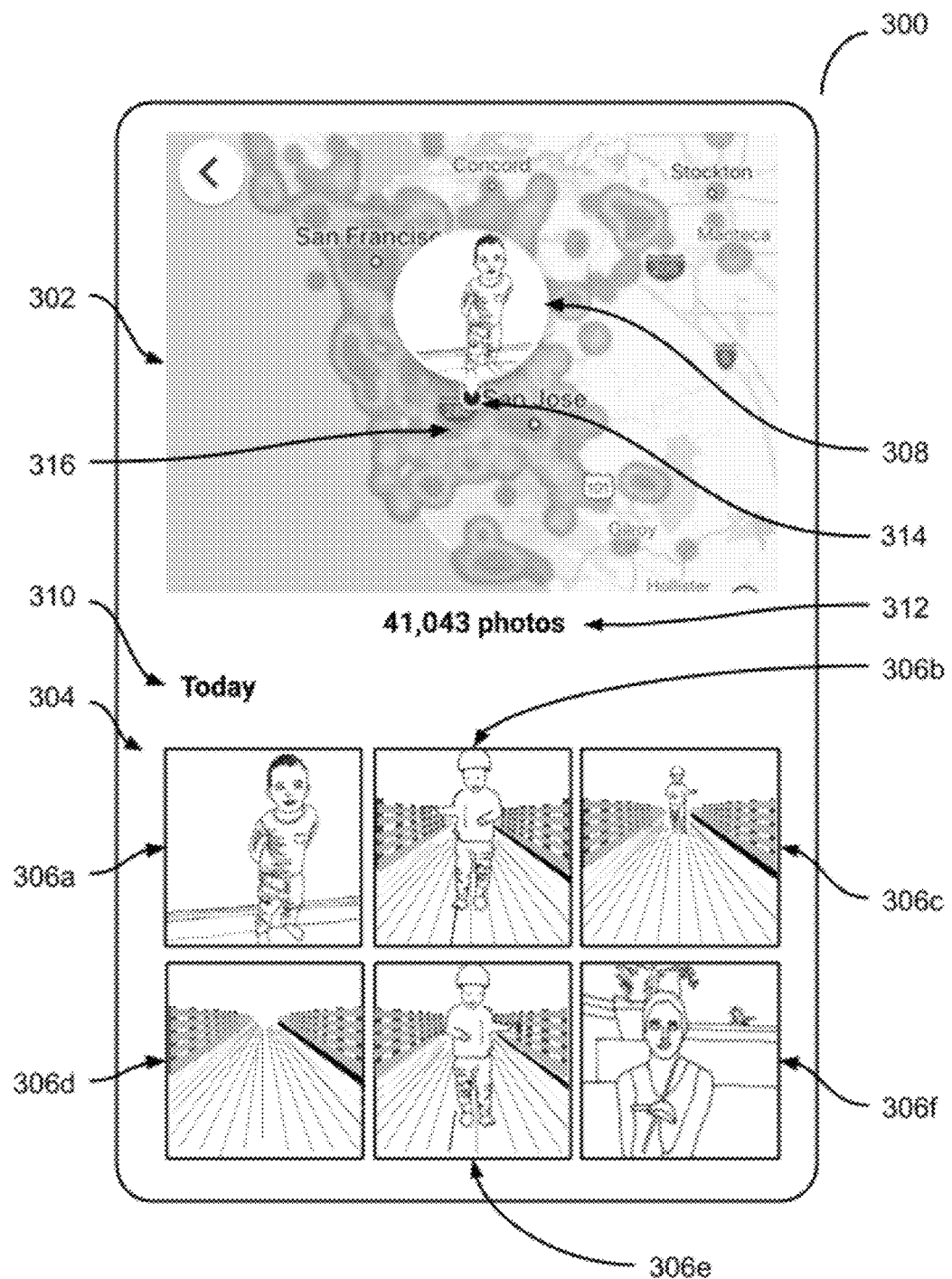
FIG. 3 illustrates an example user interface, according to some implementations.

FIG. 3 illustrates an example user interface 300, according to some implementations. User interface 300 includes a map portion 302 and a grid portion 304. As seen in FIG. 3, the grid portion includes images 306a-306f, arranged in an image grid. Images 306a-306f may each be associated with a timestamp that corresponds to the same day. In some implementations, images 306-306f may be ordered based on respective timestamps, e.g., in reverse chronological order, such that image 306a is associated with a more recent timestamp than image 306b, image 306b is associated with a more recent timestamp than image 306c, and so on. User interface 300 also includes a text label 310 ("Today") that indicates a time period for the images in the grid (images 306a-306f).

As seen in FIG. 3, map portion 302 depicts a first region of a digital map, e.g., the San Francisco bay area and some of the surrounding regions in the example of FIG. 3. The user's image library includes 41,043 images that are associated with a location within the first region, as indicated by the count of images "41,043 photos" (312) in FIG. 3.

Map portion 302 further includes an image preview 308. Image preview 308 corresponds to image 306a of grid portion 304. Image preview 308 is anchored to the location associated with the image 306a, as indicated by the icon 314. Map portion 302 also includes a heatmap 316, e.g., included as an overlay on top of the digital map. Different shades of the heatmap in different locations provide a visual indication of the number of images in the user's image library that correspond to the respective locations.

User interface 300 is configured to receive user input. For example, a user may provide touch or gesture input with respect to map portion 302, e.g., a pan, zoom-in, or zoom-out input. In response to the user input, map portion 302 is updated, as described above with reference to FIG. 2. In another example, the user may provide touch or gesture input with respect to grid portion 304, e.g., scrolling input. In response, grid portion 304 is updated, e.g., to replace one or more images 306a-306f with other images in the user's library, as described above with reference to FIG. 2. The user may also provide input via speech or other modalities to update the user interface.

User interface 300 may be reconfigurable. For example, a user may provide input to increase a size of the grid portion. In response, more rows of the grid of images may be displayed, with a corresponding smaller map portion. In another example, the user may provide input to increase a size of the map portion. In response, fewer rows of the grid of images may be displayed, or the grid may be hidden entirely.

Figure 4A:
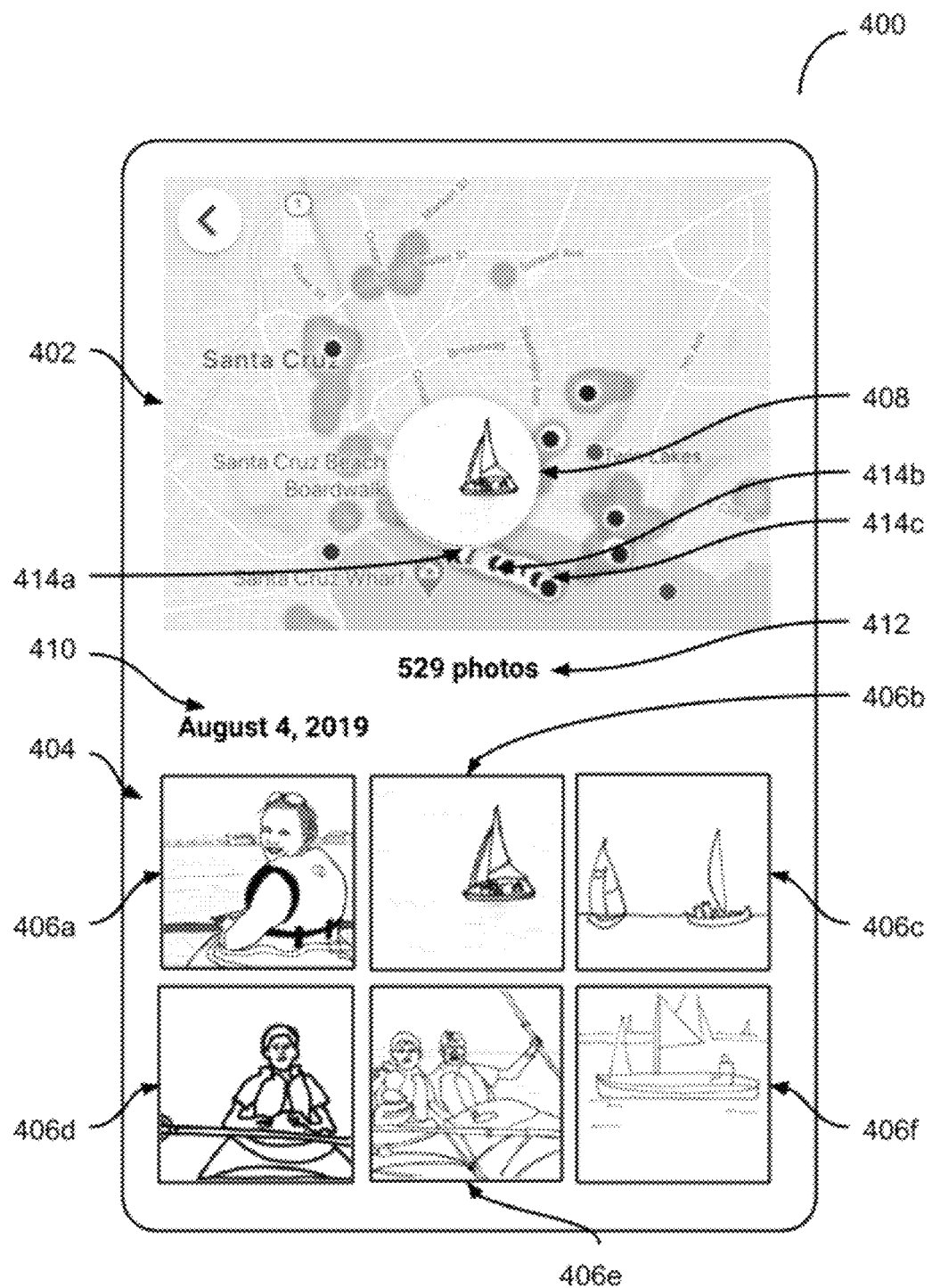
FIG. 4A-4C each illustrate an example user interface, according to some implementations.

FIG. 4A illustrates an example user interface 400, according to some implementations. User interface 400 includes a map portion 402 and a grid portion 404. As seen in FIG. 4, the grid portion includes images 406a-406f, arranged in an image grid. Images 406a-406f may each be associated with a timestamp that corresponds to the same day (Aug. 4, 2019). User interface 400 also includes a text label 410 ("Aug. 4, 2019") that indicates a time period for the images in the grid (images 406a-406e).

As seen in FIG. 4A, map portion 402 depicts a first region of a digital map, with a heatmap overlay. The user's image library includes 529 images that are associated with a location within the first region, as indicated by the count of images "529 photos" (412) in FIG. 4A.

Map portion 402 further includes an image preview 408. Image preview 408 corresponds to image 406b of grid portion 404. Image preview 408 is anchored to the location associated with the image 406b, as indicated by the icon 414a. As can be seen, locations within the first region associated with other images of the user's library that are from the same day are indicated in map portion 402 by additional icons 414b and 414c. For simplicity, other icons in map portion 402 corresponding to other images from the same day are not labeled in FIG. 4A.

Figure 4B:
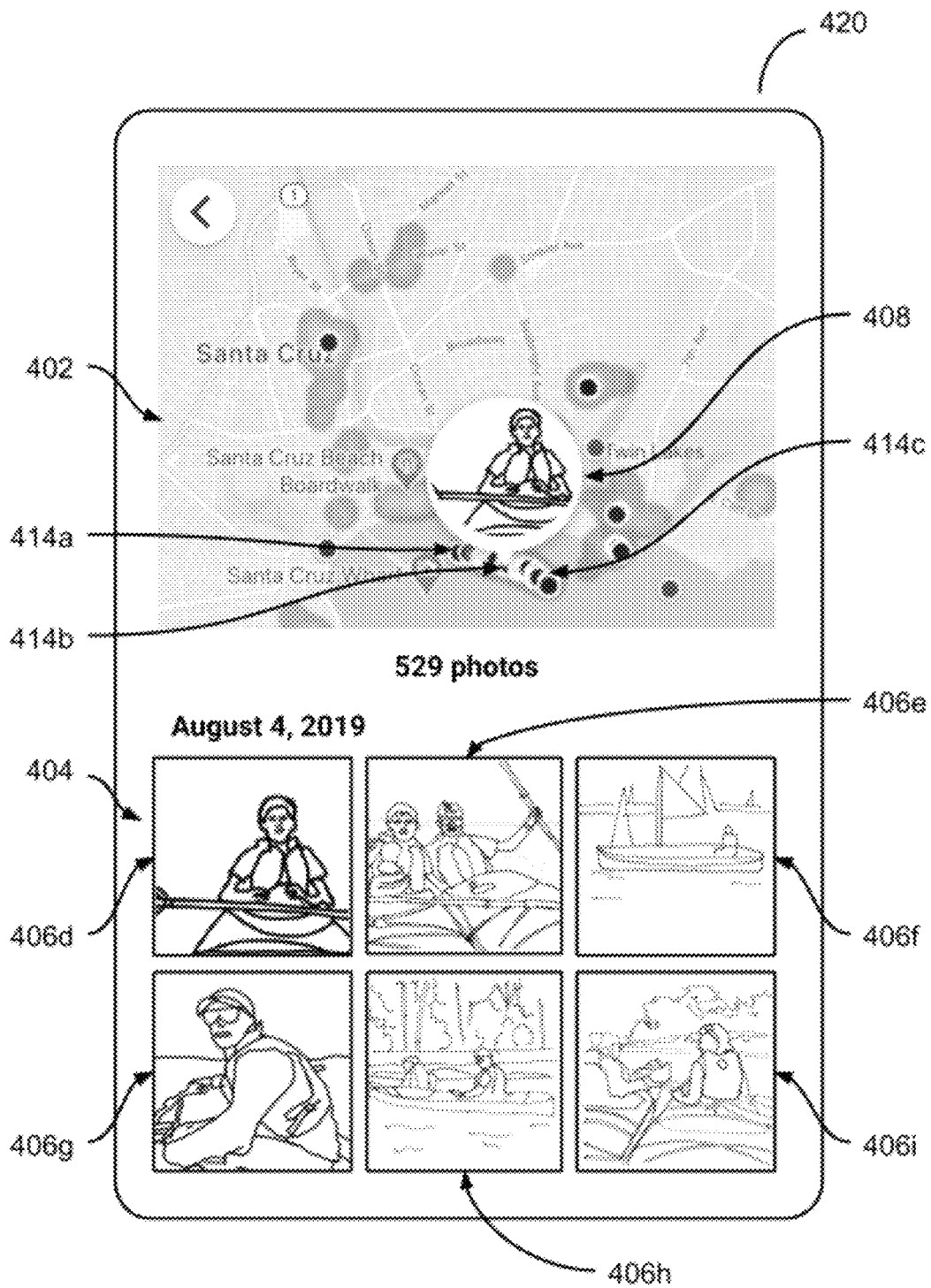

FIG. 4B illustrates a user interface 420 that is displayed after the user has provided a tap input selecting icon 414b in the map portion 402 of FIG. 4A. For clarity, some reference numerals are omitted from FIG. 4B. As seen in FIG. 4B, in response to the tap input, image preview 408 is modified to replace image 406b with image 406d and is now anchored at the location corresponding to icon 414b. Further, the grid portion is updated to remove images 406a-406c, and show images 406g-406i. Thus, grid portion 404 is updated synchronously with map portion 402. While FIG. 4B illustrates a different row of the grid, it is possible that the grid portion remains the same, e.g., when the user selects an icon corresponding to an adjacent image from the one that is in use in the image preview.

Figure 4C:
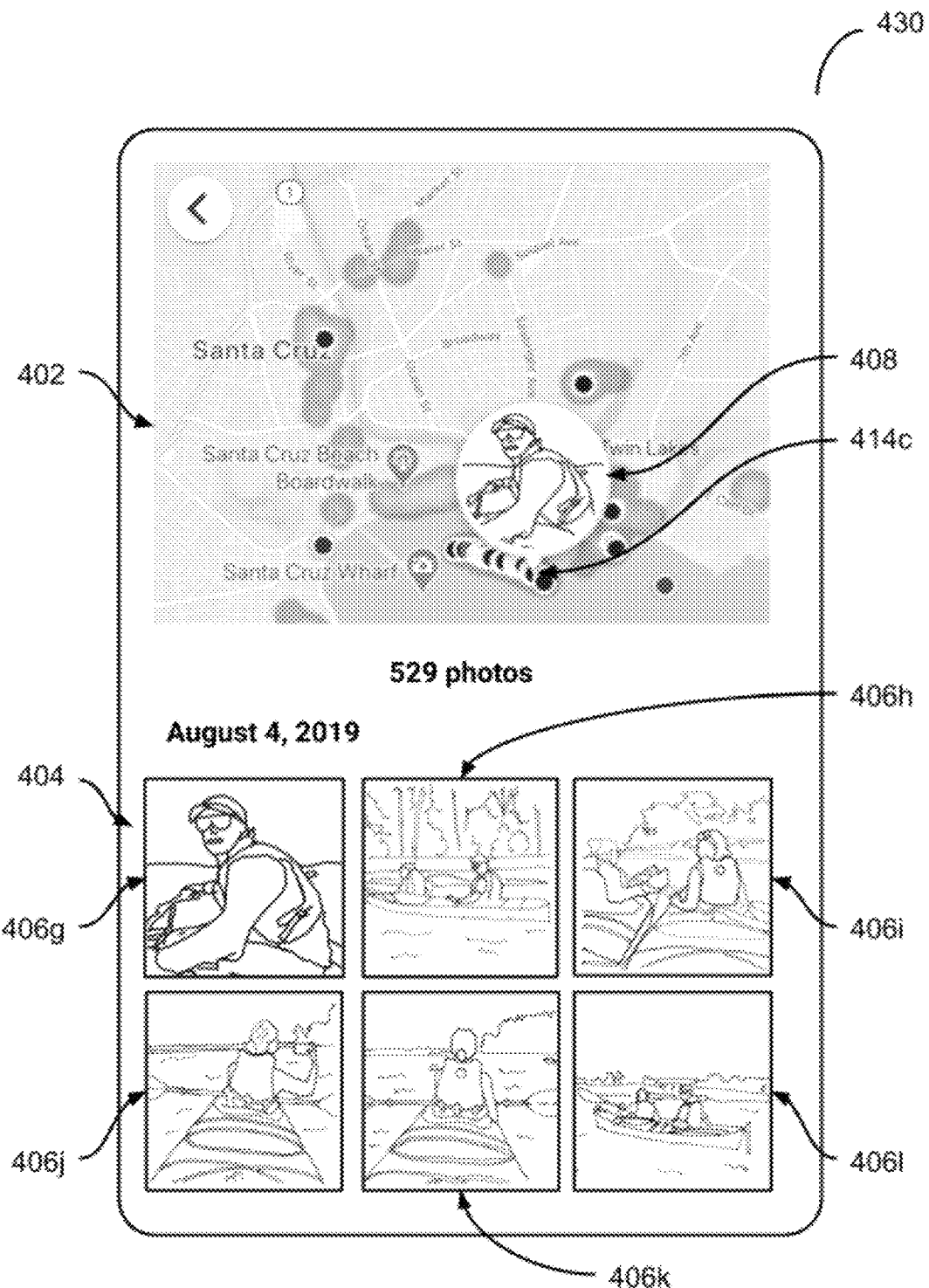

FIG. 4C illustrates a user interface 430 that is displayed after the user has provided a scroll input in the grid portion 404 of FIG. 4B. For clarity, some reference numerals are omitted from FIG. 4C. As seen in FIG. 4C, in response to the scroll input, the grid portion is updated to remove images 406d-406f, and show images 406j-406l. After updating the grid, images 406g-406i occupy the first row of the grid. The image preview 408 is modified to replace image 406d with image 406g, which is now anchored at the location corresponding to icon 414c. Thus, map portion 402 is updated synchronously with grid portion 404.

While the foregoing description refers to a tap input for the update of the user interface from FIG. 4A to FIG. 4B, and a scroll input for the update of the user interface from FIG. 4B to FIG. 4C, it will be understood that the user may perform scroll or tap inputs in any fashion, e.g., the user can tap on any icon in map portion 402 to obtain a preview of the corresponding image, or may scroll grid portion 404 to view other images from their library that correspond to the region depicted in map portion 402.

Further, the user may provide a pan input, a zoom-in input, a zoom-out input, or other input to select a different region of the digital map. In response to such input, map portion 402 is updated to display the corresponding region, including a heatmap for that region. The image preview is also updated to display an image from the corresponding region. Further, grid portion 404 is updated to display images in the user's image library that correspond to the selected region.

Figure 5:
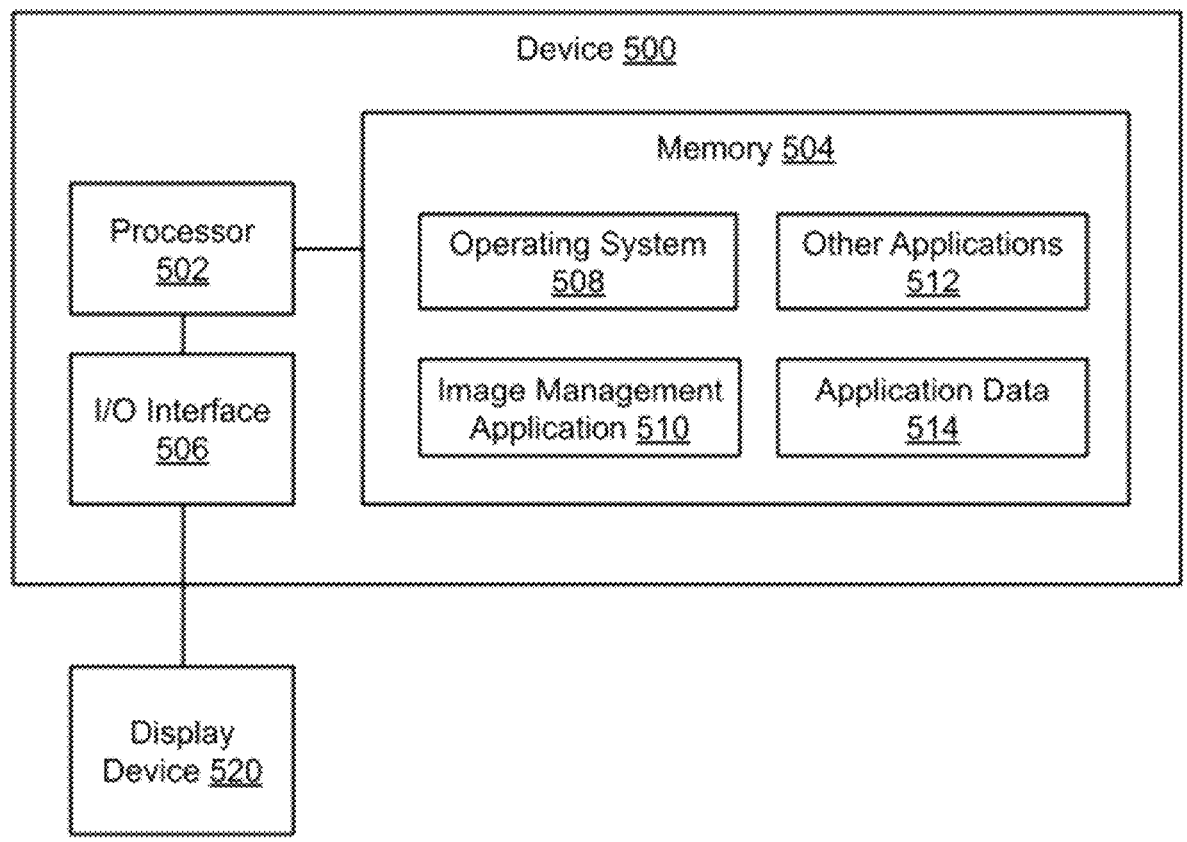
FIG. 5 is a block diagram of an example device which may be used for one or more implementations described herein.

FIG. 5 is a block diagram of an example device 500 which may be used to implement one or more features described herein. In one example, device 500 may be used to implement a client device, e.g., any of client devices 120-126 shown in FIG. 1. Alternatively, device 500 can implement a server device, e.g., server device 104. In some implementations, device 500 may be used to implement a client device, a server device, or both client and server devices. Device 500 can be any suitable computer system, server, or other electronic or hardware device as described above.

One or more methods described herein can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 500 includes a processor 502, a memory 504, and input/output (I/O) interface 506. Processor 502 can be one or more processors and/or processing circuits to execute program code and control basic operations of the device 500. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some implementations, processor 502 may include one or more co-processors that implement neural-network processing. In some implementations, processor 502 may be a processor that processes data to produce probabilistic output, e.g., the output produced by processor 502 may be imprecise or may be accurate within a range from an expected output. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 504 is typically provided in device 500 for access by the processor 502, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 502 and/or integrated therewith. Memory 504 can store software operating on the server device 500 by the processor 502, including an operating system 508, image management application 510 (e.g., which may be the same as image management application 156 of FIG. 1) other applications 512, and application data 514. Other applications 512 may include applications such as a data display engine, web hosting engine, a digital maps application, image display engine, notification engine, social networking engine, etc. In some implementations, the image management application 510 can include instructions that enable processor 502 to perform functions described herein, e.g., some or all of the method of FIG. 2.

Other applications 512 can include, e.g., digital map applications, image editing applications, media display applications, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 504 can alternatively be stored on any other suitable storage location or computer-readable medium. In addition, memory 504 (and/or other connected storage device(s)) can store one or more messages, one or more taxonomies, electronic encyclopedia, dictionaries, digital maps, thesauruses, knowledge bases, message data, grammars, user preferences, and/or other instructions and data used in the features described herein. Memory 504 and any other type of storage (magnetic disk, optical disk, magnetic tape, or other tangible media) can be considered "storage" or "storage devices."

I/O interface 506 can provide functions to enable interfacing the server device 500 with other systems and devices. Interfaced devices can be included as part of the device 500 or can be separate and communicate with the device 500. For example, network communication devices, storage devices (e.g., memory and/or database 106), and input/output devices can communicate via I/O interface 506. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 506 can include one or more display devices 520 that can be used to display content, e.g., images, video, and/or a user interface of an output application as described herein. Display device 520 can be connected to device 500 via local connections (e.g., display bus) and/or via networked connections and can be any suitable display device. Display device 520 can include any suitable display device such as an LCD, LED, or plasma display screen, CRT, television, monitor, touchscreen, 3-D display screen, or other visual display device. Display device 520 may also act as an input device, e.g., a touchscreen input device. For example, display device 520 can be a flat display screen provided on a mobile device, multiple display screens provided in glasses or a headset device, or a monitor screen for a computer device.

The I/O interface 506 can interface to other input and output devices. Some examples include one or more cameras which can capture images and/or detect gestures. Some implementations can provide a microphone for capturing sound (e.g., as a part of captured images, voice commands, etc.), a radar or other sensors for detecting gestures, audio speaker devices for outputting sound, or other input and output devices.

For ease of illustration, FIG. 5 shows one block for each of processor 502, memory 504, I/O interface 506, and software blocks 508, 510, and 512. These blocks may represent one or more processors or processing circuitries, operating systems, memories, I/O interfaces, applications, and/or software modules. In other implementations, device 500 may not have all of the components shown and/or may have other elements including other types of elements instead of, or in addition to, those shown herein. While some components are described as performing blocks and operations as described in some implementations herein, any suitable component or combination of components of environment 100, device 500, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user device's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

The invention claimed is:

1. A computer-implemented method comprising:
generating and storing an index of locations associated with images in a user's image library of an image management application, wherein the index of locations is stored in an image database;
storing at least a portion of the index in memory when the image management application is in use;
identifying a first set of images from the images in the user's image library that match a first region of a digital map based on geographic information associated with the first set of images;
causing a user interface to be displayed that includes a map portion that corresponds to the first region of the digital map and a grid portion that includes one or more images of the first set of images, wherein the map portion includes an image preview, wherein the image preview includes a particular image in the first set of images that is also included in the grid portion of the user interface, and wherein the image preview is anchored in the map portion to a location associated with the particular image and wherein the map portion further includes a plurality of blobs displayed at respective locations in the first region of the digital map, wherein each blob corresponds to one or more images in the first set of images that are associated with the respective location and wherein a color of each blob is based on a number of images that the blob corresponds to, wherein a color spectrum is used to represent a relative number of images for different locations within the first region of the digital map;
receiving user input indicative of a second region of the digital map different from the first region;
identifying a second set of images that match the second region of the digital map based on geographic information associated with the second set of images and the portion of the index stored in the memory, wherein the first set and the second set are different sets;
updating the user interface wherein, after the updating, the map portion of the updated user interface corresponds to the second region of the digital map and the grid portion of the updated user interface includes one or more images of the second set of images;
after updating the user interface, receiving scroll input with reference to the grid portion of the user interface, the scroll input indicative of a direction; and
in response to receiving the scroll input, updating the grid portion of the user interface to display a set of grid images of the second set that includes a different image that is not in the one or more images of the second set previously displayed in the grid portion prior to receiving the scroll input and causing the map portion of the user interface to be updated synchronously with the grid portion to modify the image preview to include the different image.

2. The computer-implemented method of claim 1, wherein blobs of warmer colors of the color spectrum correspond to locations in the digital map that are associated with a larger number of images and blobs of cooler colors of the color spectrum correspond to locations in the digital map that are associated with a smaller number of images.

3. The computer-implemented method of claim 1, wherein the index includes a quad-tree structure that subdivides regions of a digital map into four quadrants, wherein the identifying the first set of images is based on a lookup of the quad-tree structure based on the first region of the digital map.

4. The computer-implemented method of claim 1, wherein a blur is applied to each blob in border regions where two or more blobs intersect.

5. The computer-implemented method of claim 1, further comprising:
receiving tap input in the map portion of the user interface, the tap input indicative of selection of a particular blob of the plurality of blobs;
in response to receiving the tap input, causing the map portion of the user interface to be updated to modify the image preview to include a corresponding image, wherein the corresponding image is from the one or more images that correspond to the particular blob; and
causing the grid portion of the user interface to be updated synchronous with the map portion to include the corresponding image.

6. The computer-implemented method of claim 1, wherein each image in the first set of images is associated with a respective timestamp, further comprising:
identifying images that are associated with timestamps that are within a threshold time difference from a timestamp associated with the particular image of the image preview; and
displaying a respective icon for one or more of the identified images, the respective icon displayed at a location in the first region of the digital map that is associated with a corresponding image of the identified images.

7. The computer-implemented method of claim 1, further comprising:
grouping images in the first set of images into a plurality of buckets that each correspond to a respective location;
assigning a value to each bucket of the plurality of buckets based on a respective number of images in the bucket; and rendering the plurality of blobs by smoothing the values of the plurality of buckets and mapping the values into a color gradient.

8. The computer-implemented method of claim 1, further comprising choosing one or more colors of the color spectrum based on an underlying region of the digital map, wherein the one or more colors of the color spectrum are excluded from being used as blob colors.

9. The computer-implemented method of claim 1, wherein the first set of images excludes at least one image that matches the first region of the digital map, and wherein the identifying the first set of images includes determining at least one of the at least one image has an image type that is to be excluded, the at least one image has an image quality that does not meet a quality threshold, or the at least one image is a duplicate or near duplicate of an image included in the first set.

10. A computing device comprising:
a processor; and
a memory coupled to the processor, with instructions stored thereon that, when executed by the processor, cause the processor to perform operations comprising:
generating and storing an index of locations associated with images in a user's image library of an image management application, wherein the index of locations is stored in an image database;
storing at least a portion of the index in the memory when the image management application is in use;
identifying a first set of images from the images in the user's image library that match a first region of a digital map based on geographic information associated with the first set of images;
causing a user interface to be displayed that includes a map portion that corresponds to the first region of the digital map and a grid portion that includes one or more images of the first set of images, wherein the map portion includes an image preview, wherein the image preview includes a particular image in the first set of images that is also included in the grid portion of the user interface, and wherein the image preview is anchored in the map portion to a location associated with the particular image and wherein the map portion further includes a heatmap that includes a plurality of blobs displayed at respective locations in the first region of the digital map, wherein each blob corresponds to one or more images in the first set of images that are associated with the respective location and wherein a color of each blob is based on a number of images that the blob corresponds to, wherein a color spectrum is used to represent a relative number of images for different locations within the first region of the digital map;
receiving user input indicative of a second region of the digital map different from the first region;
identifying a second set of images that match the second region of the digital map based on geographic information associated with the second set of images and the portion of the index stored in the memory, wherein the first set and the second set are different sets;
updating the user interface wherein, after the updating, the map portion of the updated user interface corresponds to the second region of the digital map and the grid portion of the updated user interface includes one or more images of the second set of images;
after updating the user interface, receiving scroll input with reference to the grid portion of the user interface, the scroll input indicative of a direction; and in response to receiving the scroll input, updating the grid portion of the user interface to display a set of grid images of the second set that includes a different image that is not in the one or more images of the second set previously displayed in the grid portion prior to receiving the scroll input and causing the map portion of the user interface to be updated synchronously with the grid portion to modify the image preview to include the different image.

11. The computing device of claim 10, wherein the index includes a quad-tree structure that subdivides regions of a digital map into four quadrants, wherein the identifying the first set of images is based on a lookup of the quad-tree structure based on the first region of the digital map.

12. The computing device of claim 10, wherein a blur is applied in border regions where two or more blobs intersect.

13. The computing device of claim 10, wherein the operations further comprise:
receiving tap input in the map portion of the user interface, the tap input indicative of selection of a particular blob of the plurality of blobs;
in response to receiving the tap input, causing the map portion of the user interface to be updated to modify the image preview to include a corresponding image, wherein the corresponding image is from the one or more images that correspond to the particular blob; and
causing the grid portion of the user interface to be updated to include the corresponding image.

14. The computing device of claim 10, wherein each image in the first set of images is associated with a respective timestamp, and wherein the operations further comprise:
identifying images that are associated with timestamps that are within a threshold time difference from a timestamp associated with the particular image of the image preview; and
displaying a respective icon for one or more of the identified images, the respective icon displayed at a location in the first region of the digital map that is associated with a corresponding image of the identified images.

15. A non-transitory computer-readable medium with instructions stored thereon that, when executed by a processor, cause the processor to perform operations comprising:
generating and storing an index of locations associated with images in a user's image library of an image management application, wherein the index of locations is stored in an image database;
storing at least a portion of the index in memory when the image management application is in use;
identifying a first set of images from the images in the user's image library that match a first region of a digital map based on geographic information associated with the first set of images;
causing a user interface to be displayed that includes a map portion that corresponds to the first region of the digital map and a grid portion that includes one or more images of the first set of images, wherein the map portion includes an image preview, wherein the image preview includes a particular image in the first set of images that is also included in the grid portion of the user interface, and wherein the image preview is anchored in the map portion to a location associated with the particular image and wherein the map portion further includes a plurality of blobs displayed at respective locations in the first region of the digital map, wherein each blob corresponds to one or more images in the first set of images that are associated with the respective location and wherein a color of each blob is based on a number of images that the blob corresponds to, wherein a color spectrum is used to represent a relative number of images for different locations within the first region of the digital map;

receiving user input indicative of a second region of the digital map different from the first region;

identifying a second set of images that match the second region of the digital map based on geographic information associated with the second set of images and the portion of the index stored in the memory, wherein the first set and the second set are different sets;

updating the user interface wherein, after the updating, the map portion of the updated user interface corresponds to the second region of the digital map and the grid portion of the updated user interface includes one or more images of the second set of images;

receiving scroll input with reference to the grid portion of the user interface, the scroll input indicative of a direction; and in response to receiving the scroll input, updating the grid portion of the user interface to display a set of grid images of the second set that includes a different image that is not in the one or more images of the second set previously displayed in the grid portion prior to receiving the scroll input and causing the map portion of the user interface to be updated synchronously with the grid portion to modify the image preview to include the different image.

16. The non-transitory computer-readable medium of claim 15, wherein the index includes a quad-tree structure that subdivides regions of a digital map into four quadrants, wherein the identifying the first set of images is based on a lookup of the quad-tree structure based on the first region of the digital map.

17. The non-transitory computer-readable medium of claim 15, wherein the operations further comprise:
receiving tap input in the map portion of the user interface, the tap input indicative of selection of a particular blob of the plurality of blobs;
in response to receiving the tap input, causing the map portion of the user interface to be updated to modify the image preview to include a corresponding image, wherein the corresponding image is from the one or more images that correspond to the particular blob; and
causing the grid portion of the user interface to be updated synchronous with the map portion to include the corresponding image.

18. The non-transitory computer-readable medium of claim 15, wherein the operations further comprise:
identifying images that are associated with timestamps that are within a threshold time difference from a timestamp associated with the particular image of the image preview; and
displaying a respective icon for one or more of the identified images, the respective icon displayed at a location in the first region of the digital map that is associated with a corresponding image of the identified images.

* * * * *